W. V. TURNER.
BRAKE CONTROL VALVE DEVICE.
APPLICATION FILED JULY 13, 1915.
1,183,910.
Patented May 23, 1916.
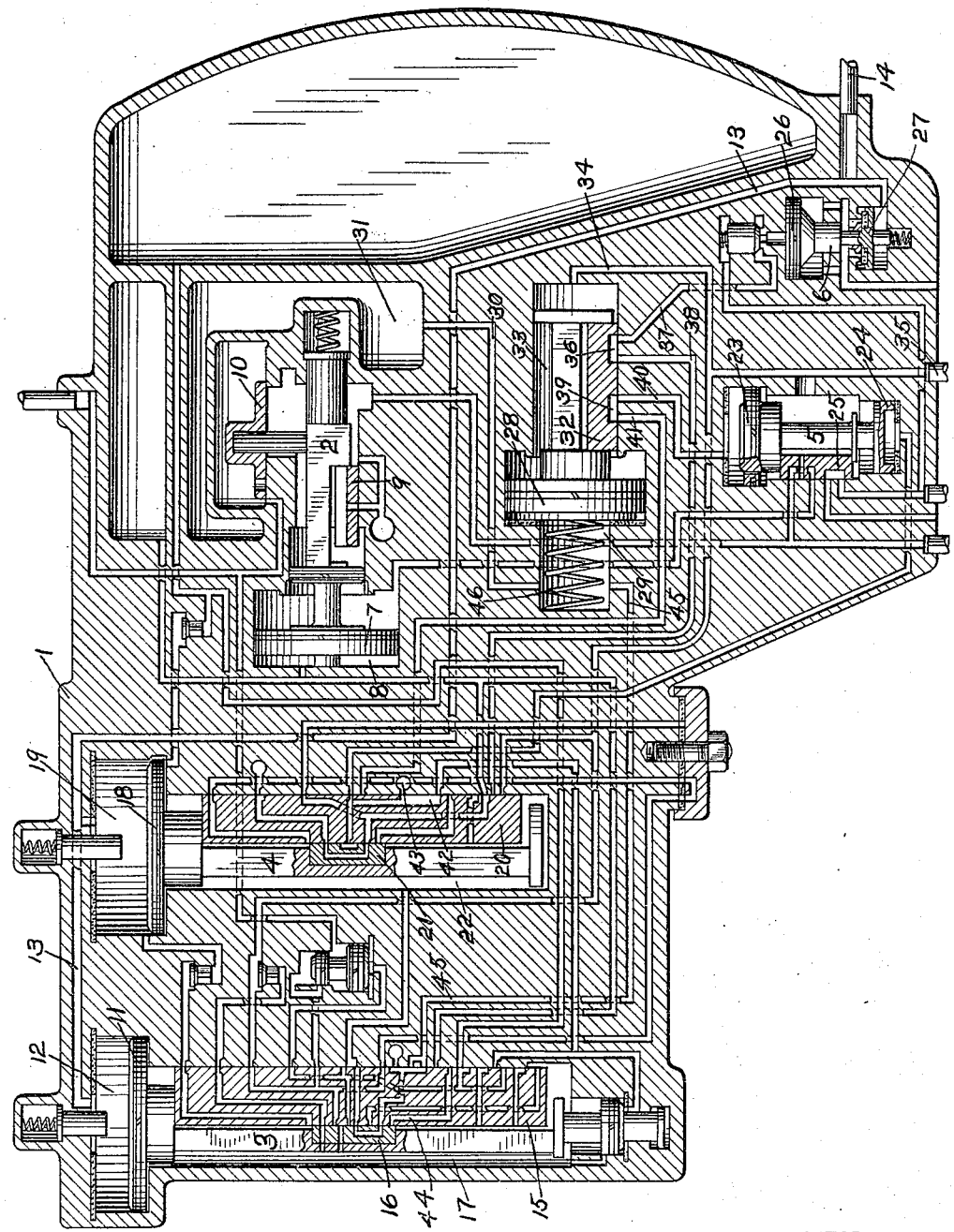
WITNESSES
H. W. Crowell
A. M. Clements
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CONTROL-VALVE DEVICE.

1,183,910.

Specification of Letters Patent.   Patented May 23, 1916.

Application filed July 13, 1915.   Serial No. 39,568.

*To all whom it may concern:*

Be it known that I, WALTER V. TURNER, a citizen of the United States, residing at Edgewood, in the county of Allegheny and State of Pennsylvania, have invented new and useful Improvements in Brake-Control-Valve Devices, of which the following is a specification.

This invention relates to fluid pressure brakes, and more particularly to a brake control valve device.

In the control valve device shown and described in my prior application, Serial No. 618,218, filed March 31, 1911, there is provided means for obtaining an emergency application of the brakes at any time, even after a full service application and also means for securing an emergency application when a predetermined over reduction in brake pipe pressure has been made.

Both features are considered very desirable, the first, for example, after having made a service reduction, in order to slow down for a signal, station stop, or otherwise, where it has become necessary to effect a sudden stop in response to a signal or to avert accident.

For similar reasons, it is desirable to be able to obtain an emergency application of the brakes after an over reduction in brake pipe pressure, but in some instances, objections have been raised, such as the fact that a startling noise is made by the brakes going to emergency which is apt to be annoying, especially to sleeping car occupants, since sleeping cars are often temporarily detached from the locomotive, so that there is a possibility of the brake pipe pressure leaking down below the over reduction point.

The principal object of my invention is to provide a control valve device of the above character in which means are provided for preventing an emergency application of the brakes upon a predetermined over reduction in brake pipe pressure.

In the accompanying drawing, the single figure is a diagrammatic central sectional view of a control valve device embodying my invention.

The control valve device may comprise a casing 1 containing an application portion 2, an equalizing portion 3, a release portion 4, an emergency valve device 5, and a quick action valve mechanism 6.

The application portion 2 comprises a piston 7 contained in application cylinder 8 and adapted to operate a brake cylinder release valve 9 and an application valve 10.

The equalizing portion 3 comprises a piston 11 contained in piston chamber 12 connected by passage 13 to brake pipe 14 and adapted to actuate a main slide valve 15 and a graduating valve 16 contained in valve chamber 17.

The release portion 4 comprises a piston 18 contained in piston chamber 19 connected to brake pipe passage 13 and adapted to operate slide valves 20 and 21 contained in valve chamber 22.

The emergency valve device 5 may comprise a differential piston having piston heads 23 and 24 and adapted to operate a slide valve 25, and the quick action valve mechanism 6 comprises a piston 26 adapted to operate a brake pipe vent valve 27. The emergency valve device 5 is adapted to be operated by venting fluid from the piston head 23 through passages controlled by the release portion 4 and the quick action valve mechanism 6 is operated by supplying fluid to the quick action piston 26 upon movement of the release valve device to emergency position.

According to my invention, means are provided for controlling communication from the release valve device to the emergency valve device and the quick action valve mechanism and adapted when a predetermined over reduction in brake pipe pressure is made to cut off said communication, so as to prevent the operation of the emergency parts. Accordingly, a piston 28 is provided, having the piston chamber 29 thereof open through a passage 30 to the reduction limiting chamber 31 and adapted to operate a valve 32 contained in valve chamber 33, open through passage 34 and pipe 35 to the usual emergency reservoir. Normally, the reduction limiting chamber 31 is at atmospheric pressure, so that the piston 28 will ordinarily be maintained at its outer seat, as shown in the drawing, by the emergency reservoir pressure in valve chamber 33. In this position, a cavity 36 in slide valve 32 connects passage 37 with passage 38, so that communication is open for supplying fluid from the release valve device to the quick action piston 26, and likewise, a cavity 39 in the valve 32 connects passage 40 with passage 41, so that communication is open for venting fluid from the piston head 23 when the release valve device moves to emergency position.

If an emergency application of the brakes is desired after a service application, it can be obtained as heretofore, since the reduction chamber 31 remains at atmospheric pressure and the piston 28 is thus maintained in its normal position. The movement of the release slide valve 20 to emergency position connects passage 41 through cavity 42 with exhaust port 43, so that fluid under pressure is vented from emergency piston 23 and the emergency valve device is then operated to effect an emergency application of the brakes. Passage 38 is also uncovered by the movement of the release slide valve 20 to emergency position, so that fluid under pressure is supplied to the quick action piston 26 and the same is thereby operated to effect the movement of the brake pipe vent valve 27. If, however, the brake pipe pressure is reduced below the equalizing point, then the equalizing piston 11 will move to the over reduction position, in which fluid is vented from the valve chamber 17 to the reduction limiting chamber 31, through port 44 in slide valve 15, passage 45, opening into piston chamber 29, and passage 30.

When a certain predetermined pressure has been built up in the reduction limiting chamber 31, by flow from the valve chamber 17, preferably at a point slightly below the usual equalized pressure in the limiting chamber, the force of the limiting chamber pressure in piston chamber 29 together with that of the spring 46 will be sufficient to effect the movement of piston 28 and valve 32 to the right, cutting off communication to the emergency piston 23 and the quick action piston 26. If the over reduction in brake pipe pressure is now continued below the normal equalizing pressure, while the equalizing piston 11 and the release piston 18 will be shifted to emergency position, there will be no operation of the emergency valve device and the quick action valve mechanism, since communication is cut off from the release slide valve to said devices by the cut-off slide valve 32.

It will now be evident that an emergency application of the brakes may still be obtained as heretofore, due to a burst hose, by operation of the conductor's valve, or by the manipulation of the brake valve, for although the pressures in all chambers including the reduction limiting chamber will equalize, so as to eventually effect the movement of the cut-off piston 28 to the right, the operation of the emergency valve device and the quick action valve mechanism will have been effected before this takes place.

In order to prevent the possible return of the emergency piston 23 to release position under the above conditions, by leakage of fluid from the valve chamber 33 to the emergency piston 23, the usual spring acting on the piston 23 may be omitted, as shown.

Having now described my invention, what I claim as new and desire to secure by Letters Patent, is:

1. In a fluid pressure brake, the combination with a brake pipe and a valve device operated upon a reduction in brake pipe pressure for effecting an emergency application of the brakes, of means operating upon an over reduction in brake pipe pressure for preventing an emergency application of the brakes.

2. In a fluid pressure brake, the combination with a brake pipe and a valve device operated upon a sudden reduction in brake pipe pressure for effecting an emergency application of the brakes, of means operating upon a predetermined over reduction in brake pipe pressure for preventing an emergency application of the brakes.

3. In a fluid pressure brake, the combination with a brake pipe, of an emergency valve device for effecting an emergency application of the brakes, valve means movable to emergency position upon a reduction in brake pipe pressure for effecting the operation of said emergency valve device, and means adapted to prevent operation of the emergency valve device upon movement of said valve means to emergency position under an over reduction in brake pipe pressure.

4. In a fluid pressure brake, the combination with a brake pipe, of a valve device for controlling the application of the brakes and having a reduction limiting chamber into which fluid is vented upon an over reduction in brake pipe pressure and means operated by the pressure in said chamber for preventing an emergency application of the brakes.

5. In a fluid pressure brake, the combination with a brake pipe, of a valve device subject to variations in brake pipe pressure and adapted to effect an emergency application of the brakes and having a reduction limiting chamber into which fluid is vented upon an over reduction in brake pipe pressure and means operating upon a predetermined increase in pressure in the reduction limiting reservoir for preventing an emergency application of the brakes when said valve device moves to emergency application position.

6. In a fluid pressure brake, the combination with a brake pipe, of an equalizing valve device operated upon an over reduction in brake pipe pressure for venting fluid to a reduction limiting chamber, an emergency valve device for effecting an emergency application of the brakes, a release valve device adapted in emergency position to open communication for effecting the operation of said emergency valve device, and a cut off valve device operated upon a predetermined increase in pressure in the reduction limiting chamber for closing said communication.

7. In a fluid pressure brake, the combination with a brake pipe, of an equalizing valve device operated upon an over reduction in brake pipe pressure for venting fluid to a reduction limiting chamber, an emergency valve device for effecting an emergency application of the brakes, a quick action valve mechanism, a release valve device having an emergency position in which communication is opened for varying the fluid pressure on said emergency valve device and said quick action valve mechanism, and a cut-off valve device operated upon a predetermined increase in pressure in the reduction limiting chamber for closing said communication.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."